US007238300B2

(12) United States Patent
Solis et al.

(10) Patent No.: US 7,238,300 B2
(45) Date of Patent: Jul. 3, 2007

(54) PROCESS FOR SUBJECTING TO ACTINIC RADIATION AND STORING AN OXYGEN SCAVENGER, AND A STORED OXYGEN SCAVENGER

(76) Inventors: James A. Solis, 6254 25th St., Groves, TX (US) 77619; Richard Dayrit, 29 Halehaven Dr., Simpsonville, SC (US) 29681; Scott W. Beckwith, 2 Rollingreen Rd., Greer, SC (US) 29651; Brian L. Butler, 100 Bellview Dr., Taylors, SC (US) 29687; Ronald L. Cotterman, 524 Spaulding Lake Dr., Greenville, SC (US) 29615; Drew V. Speer, 204 English Oak Rd., Simpsonville, SC (US) 29681; Thomas D. Kennedy, 1403 Plantation Dr., Simpsonville, SC (US) 29681

( * ) Notice: Subject to any disclaimer, the term of this patent is extended or adjusted under 35 U.S.C. 154(b) by 372 days.

(21) Appl. No.: 10/684,259

(22) Filed: Oct. 10, 2003

(65) Prior Publication Data
US 2004/0129554 A1   Jul. 8, 2004

Related U.S. Application Data

(60) Provisional application No. 60/418,654, filed on Oct. 15, 2002.

(51) Int. Cl.
*C09K 15/04* (2006.01)
*C09K 15/08* (2006.01)
*B65B 29/00* (2006.01)

(52) U.S. Cl. ................ 252/188.28; 252/184; 252/383; 252/389.1; 252/389.53; 252/399; 252/181.1; 53/400; 53/141; 428/35.2; 428/35.8; 428/215; 428/219; 428/220; 428/35.9; 428/349; 428/516; 428/411.1; 426/133; 426/234; 426/238; 426/248; 204/15

(58) Field of Classification Search ............. 252/188.28
See application file for complete search history.

(56) References Cited

U.S. PATENT DOCUMENTS

| 3,497,571 | A | 2/1970 | Tellier et al. ............... 260/844 |
| 3,536,687 | A | 10/1970 | Nordstrom ................. 260/89.5 |
| 3,632,684 | A | 1/1972 | Tellier et al. ............... 260/881 |
| 3,873,644 | A | 3/1975 | Pampus et al. ............. 260/879 |
| 4,415,710 | A | 11/1983 | Barnabeo et al. ............ 525/370 |
| 4,489,191 | A * | 12/1984 | Chung ......................... 524/779 |
| 4,524,201 | A | 6/1985 | Barnabeo et al. ............ 528/395 |
| 5,021,515 | A | 6/1991 | Cochran et al. ............. 525/371 |
| 5,116,916 | A | 5/1992 | Young ......................... 525/350 |
| 5,211,875 | A | 5/1993 | Speer et al. ............. 252/188.28 |
| 5,294,689 | A | 3/1994 | McCallum, III et al. ..... 526/271 |
| 5,346,644 | A | 9/1994 | Speer et al. ............. 252/188.28 |
| 5,350,622 | A | 9/1994 | Speer et al. ................ 428/215 |
| 5,425,896 | A | 6/1995 | Speer et al. ............. 252/188.28 |
| 5,466,756 | A | 11/1995 | Roach et al. ............. 525/330.6 |
| 5,498,364 | A | 3/1996 | Speer et al. ............. 252/188.28 |
| 5,627,239 | A | 5/1997 | Ching et al. ............. 525/330.6 |
| 5,641,825 | A | 6/1997 | Bacskai et al. .............. 524/398 |
| 5,656,692 | A | 8/1997 | Hayes ......................... 525/63 |
| 5,660,761 | A | 8/1997 | Katsumoto et al. ..... 252/188.28 |
| 5,700,554 | A | 12/1997 | Speer et al. ................ 428/220 |
| 5,736,616 | A | 4/1998 | Ching et al. ............. 525/330.3 |
| 5,741,385 | A | 4/1998 | Weinberg ................... 156/192 |
| 5,744,246 | A | 4/1998 | Ching ....................... 428/474.4 |
| 5,773,107 | A | 6/1998 | Weinberg .................. 428/35.9 |
| 5,776,361 | A | 7/1998 | Katsumoto et al. ..... 252/188.28 |
| 5,811,027 | A | 9/1998 | Speer et al. ............. 252/188.28 |
| 5,837,158 | A | 11/1998 | Shepodd et al. ......... 252/181.6 |
| 5,859,145 | A | 1/1999 | Ching et al. ............. 525/330.6 |
| 5,911,910 | A * | 6/1999 | Becraft et al. ......... 252/188.28 |
| 5,958,254 | A | 9/1999 | Rooney ...................... 210/757 |
| 6,057,013 | A | 5/2000 | Ching et al. ............... 428/35.7 |
| 6,063,307 | A | 5/2000 | Shepodd et al. ......... 252/181.6 |
| 6,139,770 | A | 10/2000 | Katsumoto et al. ..... 252/188.28 |
| 6,233,907 | B1 * | 5/2001 | Cook et al. ................... 53/400 |
| 6,254,803 | B1 | 7/2001 | Matthews et al. ...... 252/188.28 |
| 6,255,248 | B1 | 7/2001 | Bansleben et al. .......... 502/159 |
| 6,259,107 | B1 * | 7/2001 | Becraft et al. .......... 250/504 R |

(Continued)

FOREIGN PATENT DOCUMENTS

DE          1 900 181          10/1969

(Continued)

OTHER PUBLICATIONS

Ching et al., "Tasteless Oxygen Scavenging Polymers: A New Platform Technology for Food Packaging Based On Controlled Oxidation," *Oxygen Absorber . . . 2001 and Beyond*, OSP Conference, pp. 1-8 (Chicago, Jun. 19-20, 2000).
Ching et al., "Tasteless Oxygen Scavenging Polymers: A New Platform Technology for Food Packaging Based On Controlled Oxidation," *Oxygen Absorber . . . 2001 and Beyond*, OSP Conference Slides (Chicago, Jun. 19-20, 2000).
PCT/US03/32252 International Search Report (Mar. 3, 2004).

*Primary Examiner*—Joseph D. Anthony

(57) ABSTRACT

A method comprises subjecting ant oxygen scavenger to actinic radiation; and then optionally storing the oxygen scavenger in a container, the container configured such that the oxygen scavenger exhibits no substantial oxygen scavenging activity while inside the container. The dosed oxygen scavenger can later be removed from the container, if stored therein, subjected to a second dose of actinic radiation to trigger the oxygen scavenger, and used in packaging oxygen sensitive products. A stored oxygen scavenger, untriggered, is also disclosed.

25 Claims, No Drawings

U.S. PATENT DOCUMENTS

| | | | |
|---|---|---|---|
| 6,287,481 B1 | 9/2001 | Luthra et al. | 252/188.28 |
| 6,323,288 B1 | 11/2001 | Ching et al. | 525/370 |
| 6,333,087 B1 * | 12/2001 | Jerdee et al. | 428/35.9 |
| 6,346,200 B1 | 2/2002 | Rooney | 210/757 |
| 6,406,644 B2 | 6/2002 | Jerdee et al. | 252/188.28 |
| 6,449,923 B1 | 9/2002 | Cook, Jr. et al. | 53/400 |
| 6,454,965 B1 | 9/2002 | Ching et al. | 252/188.28 |
| 6,515,067 B2 | 2/2003 | Cai et al. | 524/553 |
| 6,525,123 B1 | 2/2003 | Yang et al. | 524/398 |
| 6,527,976 B1 | 3/2003 | Cai et al. | 252/188.28 |
| 6,559,205 B2 | 5/2003 | Cai et al. | 523/332 |
| 6,569,506 B1 * | 5/2003 | Jerdee et al. | 428/35.7 |
| 6,572,783 B1 | 6/2003 | Cai et al. | 252/188.28 |
| 6,607,795 B1 | 8/2003 | Yang et al. | 428/34.2 |
| 6,610,215 B1 * | 8/2003 | Cai et al. | 252/188.28 |
| 6,875,400 B2 * | 4/2005 | Speer et al. | 422/22 |
| 6,911,122 B2 * | 6/2005 | Cook et al. | 204/157.15 |
| 6,942,821 B2 * | 9/2005 | Dayrit et al. | 252/188.28 |
| 2002/0002238 A1 | 1/2002 | Laplante et al. | 525/50 |
| 2003/0151025 A1 | 8/2003 | Yang et al. | 252/188.28 |
| 2003/0153644 A1 | 8/2003 | Yang et al. | 522/149 |
| 2003/0183801 A1 | 10/2003 | Yang et al. | 252/188.28 |
| 2003/0235669 A1 | 12/2003 | Yang et al. | 428/36.6 |
| 2005/0002857 A1 * | 1/2005 | Pez et al. | 423/648.1 |

FOREIGN PATENT DOCUMENTS

| | | |
|---|---|---|
| EP | 0 040 983 | 12/1981 |
| EP | 0 418 011 | 3/1991 |
| EP | 0 477 983 | 11/1996 |
| JP | 56136347 | 10/1981 |
| JP | 62177067 | 8/1987 |
| WO | WO94/06626 | 3/1994 |
| WO | WO95/02616 | 1/1995 |
| WO | WO96/08371 | 3/1996 |
| WO | WO96/40799 | 12/1996 |
| WO | WO97/32722 | 9/1997 |
| WO | WO97/32925 | 9/1997 |
| WO | WO98/05703 | 2/1998 |
| WO | WO98/06779 | 2/1998 |
| WO | WO98/12250 | 3/1998 |
| WO | WO98/51758 | 11/1998 |
| WO | WO99/21699 | 5/1999 |
| WO | WO99/38914 | 8/1999 |
| WO | WO99/48963 | 9/1999 |
| WO | WO00/00538 | 1/2000 |
| WO | WO02/33024 | 4/2002 |

* cited by examiner

PROCESS FOR SUBJECTING TO ACTINIC RADIATION AND STORING AN OXYGEN SCAVENGER, AND A STORED OXYGEN SCAVENGER

This application claims the benefit of U.S. Provisional Application No. 60/418,654, filed Oct. 15, 2002.

FIELD OF THE INVENTION

The invention relates to a stored oxygen scavenger for use in packaging oxygen sensitive products and a process for subjecting an oxygen scavenger to actinic radiation and then storing the oxygen scavenger prior to incorporating the oxygen scavenger into a packaging article for oxygen sensitive products.

BACKGROUND OF THE INVENTION

It is known that many oxygen sensitive products, including food products such as meat and cheese, smoked and processed luncheon meats, as well as non-food products such as electronic components, pharmaceuticals, and medical products, deteriorate in the presence of oxygen. The oxidation of lipids within the food product can result in the development of rancidity, and the oxidation of flavor components, pigments, or vitamins could adversely affect the quality and freshness of foods. These products benefit from the use of oxygen scavengers in their packaging.

Some of these oxygen scavengers, typically unsaturated polymers or polymers containing benzylic hydrogens or hydrogens adjacent to heteroatoms or tertiary carbons, in compositions with transition metal catalysts, can be triggered by actinic radiation. Triggering, as the term is used herein, offers the advantage of an oxygen scavenger that does not prematurely scavenge oxygen until such time as the user decides to use the oxygen scavenger in a commercial packaging environment. The oxygen scavenger is thus "dormant" until it is passed through an exposing unit, such as a bank of UV lights through which a package structure containing an oxygen scavenger is passed to trigger the oxygen scavenging activity of the material. This is usually done just prior to a packaging step, in which a package comprising the oxygen scavenger is made, with an oxygen sensitive product placed in the package prior to closure of the package to extend the shelf life of the oxygen sensitive product.

In many cases, packagers desire high speed packaging processes. For example, packaging lines having a speed of greater than about 40 feet per minute are known in various food packaging processes. Unfortunately, triggering of the type of oxygen scavenger just described requires actinic radiation exposure having a certain energy quantity. Since the energy quantity applied is proportional to the product of the output per unit time of the energy source and the duration of the dose, it is difficult for a packaging line on which triggering of an oxygen scavenger is desired to operate at a speed greater than about 20 feet per minute under a typical quantity of UV lamps; the faster the package assembly line speed, the less the duration of the dose, and thus the greater the energy output per unit time required from the energy source. Conventional triggering equipment is already quite large, and to achieve higher speeds with this technology would require equipment capable of applying greater energy quantities to the scavenger. The size and associated costs of purchasing or leasing such equipment, maintenance costs, safe operation costs, and the requirement of space in the processing plant to accommodate such equipment, can be economically unattractive. Some processors or potential users of oxygen scavengers do not have room for large equipment.

A class of oxygen scavengers that do not require actinic triggering, and thus do not require the associated actinic triggering equipment, includes iron based scavengers and some polymeric scavengers. Such oxygen scavengers are active at the time of manufacture without triggering by actinic radiation. These oxygen scavengers also have several disadvantages, however. Some require the presence of moisture to initiate oxygen scavenging, i.e., are moisture-triggered. This may not be technically attractive in packaging environments where it is otherwise undesirable or impractical to provide a moisture source to trigger the oxygen scavenger. Also, optics of the finished package can often be undesirably compromised by discoloration or pigmentation of the oxygen scavenger itself, either in its original state or after a period of oxygen scavenging activity. Processing of these oxygen scavengers in a uniformly dispersed way can also prove difficult in conventional extrusion operations. If such scavengers are not dispersed, as is the case with iron based sachets, scavenging activity may be too localized, and uniformity of scavenging may thus not be sufficient in the entire package environment to provide proper and adequate removal of oxygen from the head space of the package, and/or active barrier from subsequent ingress of oxygen from outside the package. Furthermore, oxygen scavenging sachets are unsuitable for vacuum packaging applications.

A solution to these problems may be to provide a multi-step process of triggering an oxygen scavenger using an initial dose of actinic radiation followed by a final dose of actinic radiation at a later time. The initial dose gives the oxygen scavenger a low dose of actinic radiation that is insufficient to trigger oxygen scavenging activity. The initial dose of actinic radiation can, however, reduce the amount of actinic radiation required for triggering in later processing steps. The cumulative dose of the initial dose and final dose is sufficient to trigger oxygen scavenging activity.

This solution avoids the need to apply a single, large dose of actinic radiation to the oxygen scavenger at a customer location, and can at least in some cases avoid the need to store a triggered, active oxygen scavenger in a container such that the oxygen scavenger exhibits no substantial oxygen scavenging activity while inside the container.

DEFINITIONS

"Oxygen scavenger" and the like herein mean a composition, compound, film, film layer, coating, plastisol, gasket, bottle, insert, ribbon, sachet, packaging article, or component thereof, or the like which can reduce the amount of oxygen in a given environment.

"Actinic radiation" and the like herein mean radiation or radiant energy that produces chemical changes. Examples of actinic radiation include infrared, microwave, visible, ultraviolet light, and ionizing radiation in the form of X-ray, gamma ray, corona discharge, or electron beam irradiation, capable of causing a chemical change, as exemplified in U.S. Pat. No. 5,211,875 (Speer et al.), among other references.

"Trigger" and the like refer herein to a process by which a target scavenging rate can be induced in an oxygen scavenger. "Trigger" refers to exposing an oxygen scavenger to actinic radiation as described above to provide a total amount of energy sufficient to lead to initiation of oxygen scavenging at a target scavenging rate; "initiation" refers to the point in time at which oxygen scavenging at this target scavenging rate begins; and "induction time" refers to the length of time, if any, between triggering and initiation.

"Dosing" and variations thereof herein mean an act of exposing an oxygen scavenger to actinic radiation. "Initial dose" refers to a single or multiple doses containing a total energy X', wherein the energy X' can be any energy insufficient to trigger oxygen scavenging. The term "initial dose" thus encompasses one or more acts of exposing an oxygen scavenger to actinic radiation. A "final dose" is a dose containing energy Y' administered to an oxygen scavenger after administering an initial dose to the oxygen scavenger, wherein the energy Y' can be any energy such that the total dosage, from both the initial dose and the final dose, is sufficient to trigger oxygen scavenging.

"Container" herein means an enclosure such as a bag, pouch, vessel, or the like, that is capable of enclosing or packaging an oxygen scavenger in such a way that the oxygen scavenger exhibits no substantial oxygen scavenging activity while inside the container.

"No substantial oxygen scavenging activity" herein means that the oxygen scavenging rate of the oxygen scavenger is less than a rate that would deplete the oxygen scavenging rate or capacity of the oxygen scavenger to an extent that would render the oxygen scavenger unusable for its intended application.

"Film" herein means a film, laminate, sheet, web, coating, or the like, which can be used to package an oxygen sensitive product. The film can be used as a component in a rigid, semi-rigid, or flexible product, and can be adhered to a non-polymeric or non-thermoplastic substrate such as paper or metal. The film can also be used as a coupon or insert within a package.

"Polymer" and the like herein mean a homopolymer or a copolymer, with exemplary copolymers including bispolymers, terpolymers, etc.

"Sub-ambient" and the like herein refer to temperatures of 25° C. or less.

"Refrigerated" and the like herein refer to temperatures of 10° C. or less.

"Target scavenging rate" and the like herein refer to scavenging rates which the skilled artisan, having the benefit of the present disclosure, would both desire to achieve and be able to achieve for any particular package or other structure comprising an oxygen scavenger. The target scavenging rate for any particular oxygen scavenger in any particular package and intended for any particular use will vary according to a number of parameters, discussed below. "Oxygen scavenging capacity" and the like herein refer to the maximum amount of oxygen that can be consumed by an oxygen scavenger.

"Oxygen scavenging rate" and the like herein refer to the amount of oxygen consumed per unit time by a weight unit of an oxygen scavenger.

All compositional percentages used herein are presented on a "by weight" basis, unless designated otherwise.

SUMMARY OF THE INVENTION

In one embodiment, the present invention relates to a method comprising first subjecting an oxygen scavenger having a target scavenging rate to an initial dose of actinic radiation insufficient to trigger the oxygen scavenger; then subjecting the oxygen scavenger to a final dose of actinic radiation at a dosage, wherein the total energy of all dosages is sufficient to trigger the oxygen scavenger. In a further embodiment, the method further comprises, after the first subjecting step and before the second subjecting step, storing the oxygen scavenger in a container, the container configured such that the oxygen scavenger exhibits no substantial oxygen scavenging activity while inside the container.

DETAILED DESCRIPTION OF THE INVENTION

The present invention offers the capability of partially "exporting" the triggering function now performed at a single location, e.g. a food processor location, where oxygen scavenger materials are needed.

For example, the invention enables a package producer to subject an oxygen scavenger to an initial dose of actinic radiation in the producing facility. As indicated above the initial dose can comprise multiple doses and multiple initial doses can be administered. The initial dose is insufficient to trigger an oxygen scavenging reaction, but prepares the oxygen scavenger such that another dose of actinic radiation, e.g. on a processor's packaging line, is sufficient to trigger oxygen scavenging activity. This dose can be considered the final dose.

In one embodiment, an initial dose can be administered by exposing the oxygen scavenger to sunlight or other ambient actinic radiation or other energy.

Any of the initial dose, the final dose, or both can be administered by the producer, the processor, or any further person.

In one embodiment, the initial dose and final dose are applied using a UV light having a peak wavelength from about 200 nm to about 300 nm, such as a peak wavelength of about 254 nm.

Traditionally, "triggering" methods have followed a process wherein the "triggering" quantity of actinic radiation is applied in a single dose. One example of such a "triggering" process follows the process defined by or similar to that disclosed in U.S. Pat. No. 5,211,875. In this reference, oxygen scavenging was initiated by exposing the oxygen scavenger to actinic radiation having a wavelength of less than about 750 nm at an intensity of at least about 1.6 mW/cm$^2$ or an electron beam at a dose of at least about 0.2 megarads, wherein after initiation the oxygen scavenging rate was at least about a target scavenging rate. In this particular reference, the target scavenging rate was 0.05 cc oxygen per day per gram of oxidizable organic compound or other oxygen scavenger for at least two days after oxygen scavenging was initiated. The process disclosed by U.S. Pat. No. 5,211,875 is referred to solely as a non-limiting example. In one embodiment, the method offers a short "induction period" (the time that elapses, after exposing the oxygen scavenger to a source of actinic radiation, before initiation of the oxygen scavenging activity) so that the oxygen scavenger can be activated at or immediately prior to use during filling of a package with an oxygen sensitive material. The present triggering method is directed to applying multiple doses of actinic radiation. However, the concepts of triggering a target oxygen scavenging rate, and induction period can be applied to the current invention.

As stated above, the target scavenging rate for any particular oxygen scavenger in any particular package and intended for any particular use will vary according to a number of parameters. Those parameters include those discussed in the following paragraphs, among others.

For one, different oxygen scavengers can have different oxygen scavenging rates based on chemical differences between the scavengers. An oxygen scavenger having a higher oxygen scavenging rate can support a higher target scavenging rate than can an oxygen scavenger having a lower oxygen scavenging rate.

For another, different conditions of use can suggest different target scavenging rates. For example, if the oxygen scavenger is used in a packaging article containing an oxygen barrier layer to inhibit ingress of oxygen from the environment, and the package contents are filled in an anoxic or hypoxic manner, a lower target scavenging rate, namely a target scavenging rate sufficient to scavenge such oxygen as may slowly ingress from the environment, may be acceptable. In another example, if the package contents are filled in such a manner that a headspace containing air or air partially diluted with an inert gas is present above the package contents, a higher target scavenging rate may be desirable.

The required scavenging rate is also determined by the product to be packaged and its sensitivity to oxygen. The skilled artisan can determine from the packaged article's oxygen sensitivity the speed at which residual headspace oxygen should be removed and the permissible oxygen ingress rate from the outside the package. The permissible oxygen ingress rate can be considered in determining the oxygen barrier requirements, if any, for the package. In situations in which the product is highly sensitive to oxygen, in some embodiments the use of an oxygen scavenger can be combined with gas flushing of the partially filled package.

Also, the structure of the package containing the oxygen scavenger can suggest a higher or lower target scavenging rate. If the structure of the package has a high oxygen permeation rate, a higher target scavenging rate may be appropriate. If the structure has a low oxygen permeation rate, a lower target scavenging rate may be acceptable.

As stated above, the initial dose has an energy $X'$ (bearing in mind that the initial dose can be administered in one or more acts of exposing the oxygen scavenger to actinic radiation) and the final dose has an energy $Y'$. In one embodiment, the energy $X'$ can be any amount which induces an oxygen scavenging rate of less than or equal to about 20% of the target scavenging rate of the oxygen scavenger. ("Target scavenging rate" will be defined below). The energy $Y'$ can be any amount such that the total energy $X'+Y'$ triggers an oxygen scavenging rate of at least about the target lo scavenging rate of the oxygen scavenger. In other words, in this scheme, the oxygen scavenger is only "triggered" by administration of the final dose.

The doses of actinic radiation need not be from the same source or form. In other words, an initial dose could be from a first source of actinic radiation and a final dose could be from a second source of actinic radiation. For example, a first source could be an electron beam, infrared radiation, ultraviolet radiation, or other source of actinic radiation, and a second source could be an electron beam, infrared radiation, ultraviolet radiation, or other source of actinic radiation, wherein the first source and second source can be the same or can be different.

As stated above, the initial dose can have an amount of energy $X'$ which is insufficient to trigger oxygen scavenging. In one embodiment, the initial dose can induce an oxygen scavenging rate of less than or equal to about 20% of the target scavenging rate of the oxygen scavenger. In one embodiment, the initial dose can induce an oxygen scavenging rate of less than or equal to about 10% of the target scavenging rate of the oxygen scavenger. In a further embodiment, the initial dose can induce an oxygen scavenging rate of less than or equal to about 5% of the target scavenging rate of the oxygen scavenger. In still a further embodiment, the initial dose can induce an oxygen scavenging rate of less than or equal to about 2.5% of the target scavenging rate of the oxygen scavenger. In an even further embodiment, the initial dose can induce an oxygen scavenging rate of less than or equal to about 1% of the target scavenging rate of the oxygen scavenger.

The amount of energy $X'$ of the initial dose can be varied as a matter of routine experimentation to the skilled artisan having the benefit of the present disclosure. Energy $X'$ can be varied in relation to the acceptable or desired percentage of the target scavenging rate the skilled artisan seeks during storage of the oxygen scavenger prior to administration of the final dose. Generally, the greater $X'$, the higher the percentage of the target scavenging rate that can be seen in the oxygen scavenger during storage and prior to administration of the final dose, depending on the storage environment and other parameters.

To further illuminate this point, the duration and conditions of storage of the oxygen scavenger between the administration of the initial dose and the final dose can suggest higher or lower acceptable oxygen scavenging rates of the oxygen scavenger. For example, if the oxygen scavenger is to be stored in vacuum, the oxygen scavenging rate can be large, whereas if the oxygen scavenger is to be stored in air, it may be appropriate for the oxygen scavenging rate to be small.

Also, the amount $X'$ can be varied according to how much energy can be administered to the oxygen scavenger in the final dose. For example, if the oxygen scavenger is a component of a package filled in a fast-fill process, wherein the amount of energy that could be administered in a final dose immediately prior to filling is low as a function of filling-line geometry, throughput, or both, $X'$ can be large. If the filling process is slower, or a higher final dose can be administered for any other reason, $X'$ can be small.

In one embodiment, the sum of the energies $X'$ (of the initial dose) and $Y'$ (of the final dose) are chosen, relative to $Z'$, wherein $X'$, $Y'$, and $Z'$ satisfy the relationships $X'+Y' \geqq Z'$ and $X' < Z''$, and $Z''$ is the total amount of energy required to trigger oxygen scavenging in the oxygen scavenger when that amount of energy is administered in a single dose. The energy $Z'$ represents the amount of energy required to trigger oxygen scavenging when multiple actinic radiation doses are applied. As a result of the multiple actinic radiation doses, the amount of energy $Z'$ may be less than, greater than, or equal to the amount of energy $Z''$.

Though not to be bound by theory the difference between the energy $Z'$ and the energy $Z''$ is believed to be a result of the aging of the oxygen scavenger wherein "aging" represents the time period between an initial dose and the final dose. The difference between the energy $Z'$ as compared to the energy $Z''$ can result during aging from exposure of the oxygen scavenger to sunlight or other ambient actinic radiation, heat, other external agents or forces, reactions within the oxygen scavenger, or any combination thereof in the period between administration of the initial dose and administration of the final dose.

$Z''$ and $Z'$ can be determined, as a matter of routine experimentation by the skilled artisan having the benefit of the present disclosure, as being the amount of energy required to trigger a target oxygen scavenging rate in either a single or multiple actinic radiation dose oxygen scavenging triggering operation. In one embodiment, after initiation, the oxygen scavenging rate can be at least about 0.05 cc oxygen per day per gram of oxygen scavenger for at least two days.

For example, an oxygen scavenger that requires a dose of about 600 mJ/cm$^2$ can be given a dose of about 200 mJ/cm$^2$ prior to being shipped. If desired, the oxygen scavenger can be stored in a container for shipping. At a processor's plant, the oxygen scavenger can then be dosed with about 400 mJ/cm², which can be sufficient to trigger oxygen scavenging.

In one embodiment, after the initial dose, the package producer can roll up the oxygen scavenger into a roll or other readily storable configuration; store the oxygen scavenger in an oxygen barrier pouch, if desired; and then ship the oxygen scavenger to the processor or packager. The processor, packager, or other user can then remove the oxygen scavenger roll or other readily storable configuration from the container, if so shipped, as needed in the course of a typical packaging process. He can put the roll or other readily storable configuration on a feed mechanism that feeds the oxygen scavenger off the roll or other readily storable configuration, through an exposing unit where a final dose of actinic radiation triggers the oxygen scavenger, and on into a packaging line where the oxygen scavenger becomes a component of a package for packaging an oxygen sensitive product.

Alternatively, the user can feed the oxygen scavenger off the roll or other readily storable configuration as needed, optionally apply a final dose of irradiation to the oxygen scavenger, and use the oxygen scavenger as a component of a laminate web, e.g. a laminate web that includes the oxygen scavenger as a layer. This laminate in turn can be used in making a package. Thus, the user can be an intermediate converter who in turn uses the laminate to make a finished package, or provides the laminate to a third party for further use.

In another embodiment, the user can feed the initially-dosed oxygen scavenger off the roll or other readily storable configuration as needed, optionally apply a final dose of irradiation to the oxygen scavenger, and adhere the oxygen scavenger to a paperboard or a metalized substrate for further processing.

In the embodiments described above, the final dose can be applied after making of the package containing the oxygen scavenger and before filling the package.

In yet another alternative, the manufacturer can make a partially finished package that includes the oxygen scavenger as a component; subject the partially finished package to a low dose of actinic radiation (or subject the oxygen scavenger component to a low dose of actinic radiation before it is made into the partially finished package, or both); store the partially finished package or multiple units thereof, such as in an oxygen barrier pouch, box, or other container; and then ship the partially finished package(s) to the processor or packager. A "partially finished package" refers to any package, in any state of assembly, prior to that package's filling and shipment to consumers. Oxygen scavenging can, but need not, have been triggered or initiated for the package to be "partially finished." The processor, packager, or other user can then remove the one or plurality of partially finished packages from the shipped quantity thereof or the container containing same as needed in the course of a typical packaging process. He can then pass the partially finished package through an exposing unit where a final or subsequent dose of actinic radiation triggers the partially finished package, insert an oxygen sensitive product in or on each partially finished package, and complete and close each package.

In another embodiment, the final dose can be administered at the same time as or after the package is filled with product.

An example of a partially finished package is a thermoformed tray with an oxygen scavenger component, or a liner on the tray with an oxygen scavenger component, which can be completed by inserting an oxygen sensitive product, and then applying a lidding film to close and complete each package.

Another example of a partially finished package is barrier paperboard such as that used for juice cartons that incorporates an oxygen scavenger. The triggering of such opaque containers is described in U.S. Pat. No. 6,233,907 (Cook et al.) incorporated herein by reference in its entirety.

In one embodiment, the initial dose could be provided at high speeds during manufacture using equipment that may not be suitable for installation at a customer plant. Examples include high output germicidal lamps, medium-pressure arc lamps, pulsed xenon lamps or electron beam radiation. Dosing with pulsed light is disclosed in U.S. Pat. No. 6,449,923 (Cook et al.) and is incorporated herein by reference in its entirety. The initial dose of actinic radiation might be e-beam as part of a manufacturing step and a final dose of UV could be performed at a distribution point or in the processor's plant.

The Container

The container in some of the above embodiments can be configured such that the oxygen scavenger exhibits no substantial oxygen scavenging activity while inside the container. "Configured" herein means that the physical and chemical structure of the container, and the materials making up the container, is selected such that there is no substantial depletion of the oxygen scavenging capacity or oxygen scavenging rate of the stored oxygen scavenger while the oxygen scavenger is stored in the container. In one embodiment, the depletion of the oxygen scavenging capacity or oxygen scavenging rate is less than or equal to about 35%. In one embodiment, the depletion of the oxygen scavenging capacity or oxygen scavenging rate is less than or equal to about 20%. In a further embodiment, the depletion of the oxygen scavenging capacity or oxygen scavenging rate is less than or equal to about 10%. In still a further embodiment, the depletion of the oxygen scavenging capacity or oxygen scavenging rate is less than or equal to about 5%. In yet a further embodiment, the depletion of the oxygen scavenging capacity or oxygen scavenging rate is less than or equal to about 2.5%. In an even further embodiment, the depletion of the oxygen scavenging capacity or oxygen scavenging rate is less than or equal to about 1%.

In one embodiment, the oxygen scavenger has an oxygen scavenging rate, while in the container, of less than 0.03 cc oxygen per day per gram of oxidizable organic compound or other oxygen scavenger for at least two days while the oxygen scavenger is in the container.

Since the oxygen scavenger can be subjected, before storage, to an initial, low dose of actinic radiation that would normally not trigger oxygen scavenging activity, the oxygen scavenger may not require, for purposes of storage, a container of any special configuration, or even require a container at all. However, the oxygen scavenger may benefit from protection of the oxygen scavenger from oxygen and/or visible or ultraviolet light, such as by storing in a container, such as a gastight container, an opaque container, or a container combining both properties, among others. For example, an opaque container, or one that includes a layer having UV stabilizers or blockers, can be useful in preventing visible and/or ultraviolet light from entering the container and prematurely triggering a stored oxygen scavenger.

Specific details of particular containers are described in the particular embodiments that follow.

In one embodiment, the container is in the form of a high barrier pouch made from materials having an oxygen permeability, of the barrier material, less than 500 cm$^3$ $O_2/m^2\cdot$day$\cdot$atmosphere (tested at 1 mil thick and at 25° C. according to ASTM D3985), such as less than 100, further less than 50, and even further less than 25 cm$^3$ $O_2/m^2\cdot$day$\cdot$atmosphere such as less than 10, less than 5, and less than 1 cm$^3$ $O_2/m^2\cdot$day$\cdot$atmosphere. Examples of polymeric materials with low oxygen transmission rates are ethylene/vinyl alcohol copolymer (EVOH), polyvinylidene dichloride (PVDC), vinylidene chloride/methyl acrylate copolymer, polyamide, and polyester. In one embodiment, the polymeric material with low oxygen transmission rate is a polymer or copolymer of vinyl alcohol (such as ethylene/vinyl alcohol copolymer (EVOH)), a polyester (such as polyethylene terephthalate (PET) or polyethylene napthalate (PEN)), a polymer or copolymer of vinylidene dichloride (such as polyvinylidene dichloride (PVDC)), a polymer or copolymer of an epoxy, a polysulfone, a polymer or copolymer of acrylonitrile (such as polyacrylonitrile (PAN)), a polymer or copolymer of an isocyanate, or a polyamide other than MXD6 (e.g. nylon 6; nylon 6,6; or nylon 6,12; among others).

Alternatively, metal foil or SiOx compounds can be used to provide low oxygen transmission to the container. Metalized foils can include a sputter coating or other application of a metal layer to a polymeric substrate such as high density polyethylene (HDPE), ethylene/vinyl alcohol copolymer (EVOH), polypropylene (PP), polyethylene terephthalate (PET), polyethylene naphthalate (PEN), and polyamide (PA).

Alternatively, oxide coated webs (e.g. aluminum oxide or silicon oxide) can be used to provide low oxygen transmission to the container. Oxide coated foils can include a coating or other application of the oxide, such as alumina or silica, to a polymeric substrate such as high density polyethylene (HDPE), ethylene/vinyl alcohol copolymer (EVOH), polypropylene (PP), polyethylene terephthalate (PET), polyethylene naphthalate (PEN), and polyamide (PA).

In one embodiment, a sufficiently thick layer of a polyolefin such as LLDPE, or PVC (polyvinyl chloride) can in some instances provide a sufficiently low oxygen transmission rate for the overall film for its intended function. The exact oxygen permeability optimally required for a given application can readily be determined through experimentation by one skilled in the art.

In embodiments wherein the container comprises a barrier material, monolayer or multilayer films containing one or more layers of the barrier material can be made using conventional extrusion, coextrusion, or lamination processes, and conventional pouch, bag, or box manufacturing processes.

In one embodiment, hermetic sealing of the pouch, bag, or other container may be necessary to prevent environmental oxygen from outside the container from entering the container and depleting the oxygen scavenging capacity of the initially-dosed oxygen scavenger. Alternatively, sufficiently low storage temperatures can obviate the need for a hermetically sealed container, although a hermetically sealed container can of course be used at low storage temperatures.

In some embodiments, vacuumization of the container, and/or gas flushing of the container with an inert gas such as nitrogen or carbon dioxide, before closure, can be useful in reducing the oxygen scavenging rate of the oxygen scavenger while stored in the container.

In one embodiment, keeping the interior of the container at subambient (25° C. or less) or refrigerated (10° C. or less) temperatures can likewise reduce the oxygen scavenging rate. Very low storage temperatures can eliminate the need for the container to comprise an oxygen barrier.

The container can be substantially opaque to UV and/or visible light, but need not be.

In one embodiment, the container itself may comprise an oxygen scavenger composition in its structure. This oxygen scavenger composition can be physically separate and independent from an oxygen scavenger that can be stored in the container. The chemical species of the two compositions (the oxygen scavenger composition in the container structure and the oxygen scavenger stored in the container) can be the same or can be different.

The configuration of the container can be chosen based on a variety of factors, including the chemical nature of the oxygen scavenger, amount of the oxygen scavenger, concentration of the oxygen scavenger in a host material or diluent, physical configuration of the oxygen scavenger, presence of hermetic sealing, vacuumization and/or modified atmosphere inside the container, initial oxygen concentration inside the container, intended end use of the oxygen scavenger, intended storage time of the container before use, level of initial dose of actinic radiation, the target scavenging rate, or the acceptable or desirable fraction of the target scavenging rate the oxygen scavenger can have after the initial dose, among others.

In particular embodiments, the invention can avoid the special handling required to preserve the capacity and efficacy of triggered, active oxygen scavengers.

Oxygen scavenger formulations may require modifications to be optimized for a two- or more-step triggering as disclosed above. Such modifications can include concentration and type of photoinitiators, concentration and type of antioxidants, layer thicknesses, and layer compositions.

Keeping the oxygen scavenger substantially dormant until the point in time when the processor wishes to make use of the oxygen scavenger can be desirable. The processor can be enabled to deliver scavenging materials with the maximum potential oxygen scavenging capacity.

In one embodiment, it may be beneficial to store and transport the container at sub-ambient temperature conditions. The inventors have found that by storing the actinic radiation activated oxygen scavenger, in an oxygen barrier container (e.g. such that the atmosphere in the container has a reduced oxygen atmosphere, achieved by gas flushing the container atmosphere with an inert gas to achieve a reduced oxygen concentration or by removing the atmosphere with a vacuum packaging system) at sub-ambient temperatures, the potential to deliver the maximum potential oxygen scavenging capacity can be improved.

The Oxygen Scavenger

The presently disclosed method should be applicable to any oxygen scavenging polymer composition known in the art, for which initiation by exposure to actinic radiation or the like may be useful.

Exemplary oxygen scavengers suitable for commercial use in articles of the present invention are disclosed in U.S. Pat. No. 5,350,622, and an exemplary method of initiating oxygen scavenging generally is disclosed in U.S. Pat. No. 5,211,875. Exemplary equipment for initiating oxygen scavenging is disclosed in U.S. Pat. No. 6,287,481 (Luthra et al.). These patents are incorporated herein by reference in their entirety. According to U.S. Pat. No. 5,350,622, oxygen scavengers are made of an ethylenically unsaturated hydrocarbon and transition metal catalyst. In one embodiment, the ethylenically unsaturated hydrocarbon may be either substituted or unsubstituted. As defined herein, an unsubstituted ethylenically unsaturated hydrocarbon is any compound that possesses at least one aliphatic carbon-carbon double bond and comprises 100% by weight carbon and hydrogen. A substituted ethylenically unsaturated hydrocarbon is defined herein as an ethylenically unsaturated hydrocarbon that possesses at least one aliphatic carbon-carbon double bond and comprises about 50%-99% by weight carbon and hydrogen. Exemplary substituted or unsubstituted ethylenically unsaturated hydrocarbons are those having two or more ethylenically unsaturated groups per molecule. Additional exemplary polymeric compounds include those having three or more ethylenically unsaturated groups and a molecular weight equal to or greater than 1,000 weight average molecular weight.

Examples of unsubstituted ethylenically unsaturated hydrocarbons include, but are not limited to, diene polymers such as polyisoprene, (e.g., trans-polyisoprene) and copolymers thereof, cis and trans 1,4-polybutadiene, 1,2-polybutadienes, (which are defined as those polybutadienes possessing greater than or equal to 50% 1,2 microstructure), and copolymers thereof, such as styrenelbutadiene copolymer and styrene/isoprene copolymer. Such hydrocarbons also include polymeric compounds such as polypentenamer, polyoctenamer, and other polymers prepared by cyclic olefin metathesis; diene oligomers such as squalene; and polymers or copolymers with unsaturation derived from dicyclopentadiene, norbomadiene, 5-ethylidene-2-norbornene, 5-vinyl-2-norbomene, 4-vinylcyclohexene, 1,7-octadiene, or other monomers containing more than one carbon-carbon double bond (conjugated or non-conjugated).

Examples of substituted ethylenically unsaturated hydrocarbons include, but are not limited to, those with oxygen-containing moieties, such as esters, carboxylic acids, aldehydes, ethers, ketones, alcohols, peroxides, and/or hydroperoxides. Specific examples of such hydrocarbons include, but are not limited to, condensation polymers such as polyesters derived from monomers containing carbon-carbon double bonds, and unsaturated fatty acids such as oleic, ricinoleic, dehydrated ricinoleic, and linoleic acids and derivatives thereof, e.g. esters. Such hydrocarbons also include polymers or copolymers derived from (meth)allyl (meth)acrylates. Suitable oxygen scavenging polymers can be made by trans-esterification. Such polymers are disclosed in U.S. Pat. No. 5,859,145 (Ching et al.) (Chevron Research and Technology Company), incorporated herein by reference as if set forth in full. The composition used may also comprise a mixture of two or more of the substituted or unsubstituted ethylenically unsaturated hydrocarbons described above. While a weight average molecular weight of 1,000 or more can be desirable in certain embodiments, an ethylenically unsaturated hydrocarbon having a lower molecular weight is usable, for example, if blended with a film-forming polymer or blend of polymers, among other techniques of rendering it usable.

Other oxygen scavengers which can be used include benzylic polymers, including polymers having a polyethylenic backbone and pendant or terminal moieties containing benzyl groups, allylic polymers, including polymers having a polyethylenic backbone and pendant or terminal moieties containing allylic hydrogens, polylimonene resins, poly β-pinene, poly α-pinene, terpenes, and ether-containing polymers, including polymers having a polyethylenic backbone and pendant or terminal moieties containing ether linkages.

Other oxygen scavengers that can be used in connection with this invention are disclosed in U.S. Pat. No. 5,958,254 (Rooney), incorporated by reference herein in its entirety. These oxygen scavengers include at least one reducible organic compound which is reduced under predetermined conditions, the reduced form of the compound being oxidizable by molecular oxygen, wherein the reduction and/or subsequent oxidation of the organic compound occurs independent of the presence of a transition metal catalyst. The reducible organic compound can be a quinone, a photoreducible dye, or a carbonyl compound that has absorbance in the UV spectrum.

Other oxygen scavengers that can be used include a polymer having a polyethylenic backbone and pendant or terminal moieties comprising allylic moieties having at least one alpha hydrogen. One such oxygen scavenger is ethylene/methyl acrylate/benzyl acrylate terpolymer (EMBZ).

Other oxygen scavengers that can be used include condensation polymers containing at least one carbon-carbon double bond. The moieties of the condensation polymers containing the carbon-carbon double bond can be in the main chain of the polymer or in pendant or terminal side chains of the polymer. Examples of condensation polymers include polyesters and polyamides. In one embodiment, the condensation polymer comprises units derived from a dihydroxy or dicarboxyl block of polybutadiene. In another embodiment, the oxygen scavenger is polyamide MXD6. In one embodiment, the polyester contains either a main chain or a pendant cyclic olefinic groups and cyclic olefinic group, such as a cyclohexene moiety. In one embodiment, the condensation polymer is produced by condensation across the hydroxyl or carboxyl groups of a benzyl-, cycloalkyl- or cycloalkenyl-diol or -dicarboxylic acid, such as 3-cyclohexene-1,1-dimethanol, optionally with an appropriate comonomer, to form a polyether, polyester, polyamide, or other polymer.

An additional example of oxygen scavengers which can be used in connection with this invention are disclosed in PCT patent publication WO 99/48963 (Chevron Chemical et al.), incorporated herein by reference in its entirety. These oxygen scavengers include a polymer or oligomer having at least one cyclohexene group or functionality. These oxygen scavengers include a polymer having a polymeric backbone and a cyclic olefinic pendent group. The polymer can further comprise a linking group linking the olefinic pendent group to the polymeric backbone. In one embodiment, the polymer is ethylene/methyl acrylate/cyclohexenylmethyl acrylate terpolymer (EMCM), ethylene/vinyl cyclohexene copolymer (EVCH), ethylene/cyclohexenylmethyl acrylate copolymer (ECHA), or cyclohexenylmethyl acrylate homopolymer (CHAA).

An oxygen scavenging composition suitable for use with the invention comprises:

(a) a polymer or lower molecular weight material containing substituted cyclohexene functionality according to the following diagram:

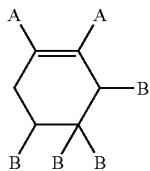

where A may be hydrogen or methyl and either one or two of the B groups is a heteroatom-containing linkage which attaches the cyclohexene ring to the said material, and wherein the remaining B groups are hydrogen or methyl;

(b) a transition metal catalyst; and optionally (c) a photoinitiator.

In one embodiment, the oxygen scavenging polymer comprises an ethylenic backbone and at least one cyclic olefinic pendant group. In a further embodiment, the cyclic olefinic pendant group is a cycloalkenyl group having the structure I:

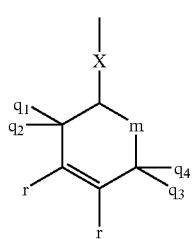

(I)

wherein $q_1$, $q_2$, $q_3$, $q_4$, and r are independently selected from hydrogen, methyl, or ethyl; m is —$(CH_2)_n$—, wherein n is an integer from 0 to 4, inclusive; X is null or a linking group; and, when r is hydrogen, at least one of $q_1$, $q_2$, $q_3$, and $q_4$ is also hydrogen. In one embodiment, $q_1$, $q_2$, $q_3$, $q_4$, r, are each hydrogen and m is $CH_2$ (i.e. the cycloalkenyl group is cyclohexenyl).

One exemplary oxygen scavenging compound is ethylene/vinyl cyclohexene copolymer (EVCH).

In a further embodiment, X is a linking group linking the ethylenic backbone to the cyclic olefinic group. The linking group can be selected from:

—O—$(CHR)_n$—; —C(=O)—O—$(CHR)_n$—; —NH—$(CHR)_n$—; —O—C(=O)—$(CHR)_n$—; —C(=O)—NH—$(CHR)_n$—; or —C(=O)—O—CHOH—$CH_2$—O—.

wherein each R is independently hydrogen, methyl, or ethyl. In one embodiment, the oxygen scavenging polymer is a homopolymer or a copolymer of cyclohexenylmethyl acrylate. Exemplary oxygen scavenging polymers include ethylene/methyl acrylate/cyclohexenylmethyl acrylate terpolymer (EMCM), ethylene/cyclohexenylmethyl acrylate copolymer (ECHA), and cyclohexenylmethyl acrylate homopolymer (CHAA).

Also suitable for use in the present invention is the oxygen scavenger of U.S. Pat. No. 6,255,248 (Bansleben et al.), incorporated herein by reference in its entirety, which discloses a copolymer of ethylene and a strained, cyclic alkylene, such as cyclopentene; and a transition metal catalyst.

Another oxygen scavenger that can be used in connection with this invention is the oxygen scavenger of WO 00/00538, published Jan. 6, 2000, incorporated herein by reference in its entirety, which discloses ethylene/vinyl aralkyl copolymer and a transition metal catalyst.

Other oxygen scavengers that can be used include those disclosed in U.S. patents to Katsumoto et al., U.S. Pat. No. 5,660,761; Katsumoto et al., U.S. Pat. No. 5,776,361; Jerdee et al., U.S. Pat. No. 6,333,087; Jerdee et al., U.S. Pat. No. 6,406,644; Ching et al., U.S. Pat. No. 6,057,013; Ching et al., U.S. Pat. No. 6,323,288; Ching et al., U.S. Pat. No. 6,454,965; Jerdee et al., U.S. Pat. No. 6,569,506; Ching et al., U.S. Pat. No. 5,736,616; Ching et al., U.S. Pat. No. 5,627,239; Ching et al., U.S. Pat. No. 5,859,145; Ching, U.S. Pat. No. 5,744,246; Bacskai et al., U.S. Pat. No. 5,641,825; Yang et al., U.S. Pat. No. 6,525,123; Cai et al., U.S. Pat. No. 6,610,215; Cai et al., U.S. Pat. No. 6,572,783; Cai et al., U.S. Pat. No. 6,527,976; Cai et al., U.S. Pat. No. 6,559,205; Cai et al., U.S. Pat. No. 6,515,067; Yang et al., U.S. Pat. No. 6,607,795; the disclosures of which are hereby incorporated by reference.

Other oxygen scavengers which can be used include those disclosed in U.S. applications to Ching et al., Ser. No. 09/127,316; Yang et al., Ser. No. 10/600,010; Yang et al., Ser. No. 09/595,410; Yang et al., Ser. No. 09/666,642; Laplante et al., Ser. No. 09/800,418; Yang et al., Ser. No. 10/072,806; Yang et al., Ser. No. 10/076,064; Yang et al., Ser. No. 10/109,266; Yang et al., Ser. No. 10/442,799; the disclosures of which are hereby incorporated by reference.

The compositions may be polymeric in nature or they may be lower molecular weight materials. In either case they may be blended with further polymers or other additives. In the case of low molecular weight materials they will most likely be compounded with a carrier resin before use.

When used in forming a packaging article, the oxygen scavenging composition of the present invention can include only the above-described polymers and a transition metal catalyst. However, photoinitiators can be added to further facilitate and control the initiation of oxygen scavenging properties. Suitable photoinitiators are known to those skilled in the art. Specific examples include, but are not limited to, benzophenone, and its derivatives, such as methoxybenzophenone, dimethoxybenzophenone, dimethylbenzophenone, diphenoxybenzophenone, allyloxybenzophenone, diallyloxybenzophenone, dodecyloxybenzophenone, dibenzosuberone, 4,4'-bis(4-isopropylphenoxy)benzophenone, 4-morpholinobenzophenone, 4-aminobenzophenone, tribenzoyl triphenylbenzene, tritoluoyl triphenylbenzene, 4,4'-bis(dimethylamino)benzophenone, acetophenone and its derivatives, such as, o-methoxyacetophenone, 4'-methoxyacetophenone, valerophenone, hexanophenone, α-phenylbutyrophenone, p-morpholinopropiophenone, benzoin and its derivatives, such as, benzoin methyl ether, benzoin butyl ether, benzoin tetrahydropyranyl ether, 4-o-morpholinodeoxybenzoin, substituted and unsubstituted anthraquinones, α-tetralone, acenaphthenequinone, 9-acetylphenanthrene, 2-acetyl-phenanthrene, 10-thioxanthenone, 3-acetylphenanthrene, 3-acetylindole, 9-fluorenone, 1-indanone, 1,3,5-triacetylbenzene, thioxanthen-9-one, isopropylthioxanthen-9-one, xanthene-9-one, 7-H-benz[de]anthracen-7-one, 1'-acetonaphthone, 2'-acetonaphthone, acetonaphthone, 2,4,6-trimethylbenzoyldiphenylphosphine oxide, bis(2,4,6-trimethylbenzoyl)phenylphosphine oxide, ethyl-2,4,6-trimethylbenzoylphenyl phosphinate, bis(2,6-dimethoxybenzoyl)-2,4,4-trimethylpentyl phosphine oxide, benz[a]anthracene-7,12-dione, 2,2-dimethoxy-2-phenylacetophenone, α,α-diethoxyacetophenone, α,α-dibutoxyacetophenone, 4-benzoyl-4'-methyl(diphenyl sulfide) and the like. Single oxygen-generating photosensitizers such as Rose Bengal, methylene blue, and tetraphenylporphine as well as polymeric initiators such as poly (ethylene carbon monoxide) and oligo[2-hydroxy-2-methyl- 1-[4-(1-methylvinyl)phenyl]propanone] also can be used. The amount of photoinitiator can depend on the amount and type of cyclic unsaturation present in the polymer, the wavelength and intensity of radiation used, the nature and amount of antioxidants used, and the type of photoinitiator used.

Other photoinitiators that are useful in the present invention include benzophenone derivatives containing at least two benzophenone moieties, as described in Katsumoto et al., U.S. Pat. No. 6,139,770. Such benzophenone derivatives have a very low degree of extraction from oxygen scavengers, which may lead to reduced malodor or off-taste of a packaged food, beverage, or oral pharmaceutical product by extracted photoinitiator. These photoinitiators include tribenzoyl triphenylbenzene, substituted tribenzoyl triphenylbenzene, benzoylated styrene oligomer, substituted benzoylated styrene oligomer, substituted dibenzoyl biphenyl, benzoylated terphenyl, or substituted benzoylated terphenyl, wherein the substituents are alkyl, aryl, alkoxy, phenoxy, or alicylic groups containing from 1 to 24 carbon atoms or halides.

As indicated above, the oxygen scavenger can be combined with a transition metal catalyst. The transition metal catalyst can be located in the same layer as the oxygen scavenger or an adjacent layer. Suitable metal catalysts are those that can readily interconvert between at least two oxidation states.

In one embodiment, the catalyst is in the form of a transition metal salt, with the metal selected from the first, second or third transition series of the Periodic Table. Suitable metals include, but are not limited to, manganese II or III, iron II or III, cobalt II or III, nickel II or III, copper I or II, rhodium II, III or IV, and ruthenium II or III. The oxidation state of the metal when introduced is not necessarily that of the active form. The metal can be iron, nickel, copper, rhodium, ruthenium, manganese, or cobalt. Suitable counterions for the metal include, but are not limited to, chloride, acetate, stearate, palmitate, caprylate, linoleate, tallate, 2-ethylhexanoate, neodecanoate, oleate, or naphthenate. Particular salts include cobalt (II) 2-ethylhexanoate, cobalt stearate, and cobalt (II) neodecanoate. The metal salt may also be an ionomer, in which case a polymeric counterion is employed. Such ionomers are well known in the art.

Charged, carbon-containing compounds can provide the organic counterion of the transition metal organic salt. Suitable counterions for the metal include, but are not limited to, acetate, oleate, stearate, palmitate, 2-ethylhexanoate, neodecanoate, naphthenate, or ionomers. In one embodiment, the organic counterion is a carboxylate, i.e., comprises a —COO⁻ moiety. In a further embodiment, the counterion is selected from $C_1$-$C_{20}$ alkanoates. It can be desirable for the salt, the transition metal, and the counterion to be either on the U.S. Food and Drug Administration GRAS (generally regarded as safe) list, or exhibit substantially no migration from the packaging article to the product (i.e. less than about 500 ppb, such as less than about 50 ppb, in the product). However, such conditions are not necessarily required for all applications.

In one embodiment, the transition metal organic salt is cobalt oleate. In one embodiment, the transition metal organic salt is cobalt stearate. In one embodiment, the transition metal organic salt is cobalt neodecanoate.

Any of the above-mentioned oxygen scavengers and transition metal catalyst can be further combined with one or more polymeric diluents, such as thermoplastic polymers that are typically used to form layers in plastic packaging articles. In the manufacture of certain packaging articles well known thermosets can also be used as the polymeric diluent.

Further additives can also be included in the composition to impart properties desired for the particular article being manufactured. Such additives include, but are not necessarily limited to, fillers, pigments, dyestuffs, antioxidants, stabilizers, processing aids, plasticizers, fire retardants, anti-fog agents, etc.

The mixing of the components listed above can be accomplished by melt blending at a temperature in the range of 50° C. to 300° C. However, alternatives such as the use of a solvent followed by evaporation may also be employed.

Oxygen scavenging structures can sometimes generate reaction byproducts, which can affect the taste and smell of the packaged material (i.e. organoleptic properties), or raise food regulatory issues. This problem can be minimized by the use of polymeric functional barriers. Polymeric functional barriers for oxygen scavenging applications are disclosed in WO 96/08371 to Ching et al. (Chevron Chemical Company), WO 94/06626 to Balloni et al., and copending U.S. patent application Ser. No. 08/813752 (Blinka et al.) and Ser. No. 09/445645 (Miranda), all of which are incorporated herein by reference as if set forth in full, and include high glass transition temperature ($T_g$) glassy polymers such as polyethylene terephthalate (PET) and nylon 6 that can be further oriented; low $T_g$ polymers and their blends; a polymer derived from a propylene monomer, such as polypropylene; a polymer derived from a methyl acrylate monomer; a polymer derived from a butyl acrylate monomer; a polymer derived from a methacrylic acid monomer; polyethylene terephthalate glycol (PETG); amorphous nylon; ionomer; a polymeric blend including a polyterpene; and poly (lactic acid). The functional barriers can be incorporated into one or more layers of a multilayer article that includes an oxygen scavenging layer.

Depending on the oxygen scavenging polymer and other parameters, the level of reaction byproducts may be sufficiently low that the use of a polymeric functional barrier may not be necessary.

The oxygen scavenger can comprise other layers known in the art, such as at least one structural layer, at least one oxygen barrier layer, one or more layers which are permeable to oxygen, and one or more adhesive layers, among others. Suitable components for such other layers are known in the art. The skilled artisan having the benefit of the present disclosure can select such other layers, if any, as a matter of routine experimentation.

In one embodiment, the method further comprises determining the amount of energy Z''' required to initiate oxygen scavenging in the oxygen scavenger, when that amount of energy is administered in a single dose.

In one embodiment, the method further comprises determining the amount of energy Z' required to initiate oxygen scavenging in the oxygen scavenger, when that amount of energy is administered in multiple doses.

EXAMPLES

Example 1

An oxygen scavenger film is produced having the following structure:

| Layer 1 | Layer 2 | Layer 3 | Layer 4 | Layer 5 | Layer 6 |
|---------|---------|---------|---------|---------|---------|
| 0.25    | 0.15    | 0.5     | 2.00    | 0.1     | 0.54    |

The thickness of each layer is indicated in the above table. The total thickness of the film is 3.54 mils.

Compositionally, each layer is formulated as follows:

Layer 1 is a blend of 60%, by weight of the blend, of a single site catalyzed ethylene/hexene copolymer, and 40%, by weight of the blend, of a polyethylene-based silica/antioxidant masterbatch.

Layer 2 is a blend of 50%, by weight of the blend, of a propylene/ethylene copolymer, and 40%, by weight of the blend, of a ethylene/methyl acrylate copolymer.

Layer 3 is a blend of 45%, by weight of the blend, of an ethylene/vinyl acetate copolymer, 40%, by weight of the blend, of a styrene/butadiene copolymer, and 15%, by weight of the blend, of an ethylene/vinyl acetate copolymer-based masterbatch containing a photoinitiator and a transition metal catalyst.

Layer 4 is a blend of 35%, by weight of the blend, of an ethylene/vinyl acetate copolymer, 60%, by weight of the blend, of a linear low density polyethylene, and 5%, by weight of the blend, of a polyethylene-based silica/antioxidant masterbatch.

Layer 5 is a polyurethane-based adhesive.

Layer 6 is a saran-coated polyethylene terephthalate.

Layers 1 through 4 are coextruded by conventional coextrusion techniques. The coated polyethylene terephthalate is then adhered to the substrate of layers 1 to 4 by means of the polyurethane-based adhesive.

The film is subjected to ultraviolet light at a dose of about 200 mJ/cm$^2$. The film, which is not triggered, is stored at ambient temperature in a clear pouch having an oxygen barrier layer. During two days of storage, the film exhibits an oxygen scavenging rate less than 0.01 cc oxygen per day per gram of the oxygen scavenger. After two days, the film is removed from the container, and dosed with 400 mJ/cm$^2$, which triggers the oxygen scavenger.

Example 2

Film samples (each 200 cm$^2$) having an A/B/A structure of 0.5 mils low density polyethylene (LDPE)/0.5 mils oxygen scavenging polymer composition (OSP)/0.5 mils LDPE were prepared, wherein the OSP comprised 90% EMCM+ 10% of a masterbatch (1% Co as cobalt oleate and 1% tribenzoyl triphenylbenzene in ethylene/methyl acrylate base resin) were prepared. The film samples were exposed to UVC (254 nm) germicidal lamps. Measured output was ~11 mW/cm$^2$. Resulting dosages for various exposure times were as follows:

15 seconds=165 mJ/cm$^2$
30 seconds=330 mJ/cm$^2$
45 secs=495 mJ/cm$^2$
60 seconds=660 mJ/cm$^2$
75 secs=825 mJ/cm$^2$
90 seconds=990 mJ/cm$^2$ After a initial dose of duration 0, 15, 30, or 60 sec, the film samples were vacuum packed in bags made of metal foil, and stored for two weeks. Thereafter, the films were removed from the foil bags and exposed to Uv for a final dose with a duration of 0, 15, 30, 45, 60, 75, or 90 sec, in order to trigger oxygen scavenging.

The initial and final dose regimen for a given OSP sample will be given as (x, y), wherein x is the initial dose duration in seconds, and y is the final dose duration in seconds.

The activated films were tested for oxygen scavenging performance by inserting into a foil bag filling the foil bag with 200 cc air, sealing the foil bag, and storing under refrigeration. Oxygen scavenging was assayed by the taking of bag headspace contents samples at periodic intervals, usually daily, and subsequent testing of the headspace samples on an oxygen analyzer.

The results are given as cc O2 consumed per gram of oxygen scavenger, at about 0-3 days.

TABLE 2-1

Initial dose of 0 sec.

| Time | Film sample (initial dose, final dose) | | | |
|---|---|---|---|---|
| (days) | (0, 15) | (0, 30) | (0, 60) | (0, 90) |
| 0.00 | 0.00 | 0.00 | 0.00 | 0.00 |
| 1.04 | 0.00 | 0.00 | 0.53 | 13.94 |
| 1.98 | 0.00 | 0.00 | 7.07 | 26.58 |
| 2.95 | 0.00 | 0.00 | 18.50 | 37.17 |

TABLE 2-2

Initial dose of 15 sec.

| Time | Film sample (initial dose, final dose) | | | |
|---|---|---|---|---|
| (days) | (15, 0) | (15, 15) | (15, 45) | (15, 75) |
| 0.00 | 0.00 | 0.00 | 0.00 | 0.00 |
| 1.04 | 0.00 | 0.53 | 0.53 | 11.40 |
| 1.98 | 0.00 | 0.01 | 6.57 | 27.53 |
| 2.95 | 0.00 | 0.01 | 21.40 | 41.27 |

TABLE 2-3

Initial dose of 30 sec.

| Time | Film sample (initial dose, final dose) | | | |
|---|---|---|---|---|
| (days) | (30, 0) | (30, 15) | (30, 45) | (30, 60) |
| 0.00 | 0.00 | 0.00 | 0.00 | 0.00 |
| 1.04 | 0.53 | 0.00 | 1.57 | 12.95 |
| 1.98 | 0.01 | 3.05 | 10.63 | 30.91 |
| 2.95 | 0.51 | 14.71 | 27.72 | 44.97 |

TABLE 2-4

Initial dose of 60 sec.

| Time | Film sample (initial dose, final dose) | | | |
|---|---|---|---|---|
| (days) | (60, 0) | (60, 15) | (60, 30) | (60, 60) |
| 0.00 | 0.00 | 0.00 | 0.00 | 0.00 |
| 1.04 | 0.00 | 0.00 | 3.14 | 10.90 |
| 1.98 | 0.00 | 9.11 | 21.06 | 29.43 |
| 2.95 | 6.93 | 25.79 | 38.65 | 44.88 |

In comparing the (0, 90) sample, which represents a typical one-step process, the (15, 75), (30, 60), (60, 30), and (60, 60) samples of a two-step process exhibited comparable oxygen scavenging activity over 0-3 days, but required at least 17%-33% less final dose time. Given the general observation that the filling rate is inversely proportional to dose time, this two-step process would be expected to lead to a 25%-50% increase in the packaging line speed relative to a typical one-step process. Additionally, these result provide example of how one skilled in the art can practice the invention wherein a induction period is used for example the film samples exposed to a (initial dose, final dose) of (15,45), and (60,15) all had induction period of at least one day while other film samples exposed to other (initial dose, final dose) exposure had induction period less than or greater than one day.

The invention is not limited to the illustrations described herein, which are deemed to be merely illustrative, and susceptible of modification of form, size, arrangement of parts and details of operation.

What is claimed is:

1. A method comprising:
   a) first subjecting an oxygen scavenger having a target scavenging rate to an initial dose of actinic radiation insufficient to trigger the oxygen scavenger; then
   b) storing the oxygen scavenger of step a) in a container and removing the oxygen scavenger from the container prior to step c); and
   c) subjecting the oxygen scavenger of step b) to a final dose of actinic radiation at a dosage, wherein the total energy of all doses is sufficient to trigger the oxygen scavenger.

2. The method of claim 1, wherein the container is configured such that the oxygen scavenging capacity of the oxygen scavenger or the oxygen scavenging rate of the oxygen scavenger is depleted by less than or equal to about 35% while in the container.

3. The method of claim 1, wherein the container comprises a barrier resin.

4. The method of claim 3, wherein the harrier resin has an oxygen transmission rate of less than 500 cm3/m2·day·atm (ASTM D 3985-95).

5. The method of claim 3, wherein the barrier resin is selected from the group consisting of:
   i) a polymer or copolymer of vinyl alcohol,
   ii) a polymer or copolymer of vinylidene dichloride,
   iv) a polyamide other than MXD6,
   v) polyester,
   vi) a polymer or copolymer of an epoxy,
   vii) a polysulfone,
   viii) a polymer or copolymer of acrylonitrile, and
   ix) a polymer or copolymer of an isocyanate.

6. The method of claim 3, wherein the container comprises an oxygen scavenger.

7. The method of claim 1, wherein the container for storing the oxygen scavenger of step a) comprises an oxygen scavenger.

8. The method of claim 3, wherein the container comprises an opaque material.

9. The method of claim 1, wherein the container comprises a material selected from the group consisting of:
   a) a metal foil;
   b) a metallized foil; and
   c) an oxide coated web.

10. The method of claim 1, wherein the container is in the form of a pouch.

11. The method of claim 1, wherein the oxygen scavenger is stored under an inert atmosphere.

12. The method of claim 1, wherein the oxygen scavenger is stored under vacuum.

13. The method of claim 1, wherein the oxygen scavenger is stored at a subambient temperature.

14. The method of claim 1, wherein between the first subjecting step and the second subjecting step the oxygen scavenging capacity of the oxygen scavenger or the oxygen scavenging rate of the oxygen scavenger is depleted by less than or equal to about 35%.

15. The method of claim 1, wherein the initial dose has an energy X', wherein X' is an amount of energy which induces an oxygen scavenging rate of less than or equal to about 20% of the target scavenging rate of the oxygen scavenger.

16. The method of claim 15, wherein the final dose has an energy Y' and Y' is an amount of energy such that the total energy X'+Y' triggers an oxygen scavenging rate of at least about the target scavenging rate of the oxygen scavenger.

17. The method of claim 1, wherein the oxygen scavenger comprises a material selected from the group consisting of:
   i) oxidizable organic compound and a transition metal catalyst,
   ii) ethylenically unsaturated hydrocarbon and a transition metal catalyst,
   iii) a reduced form of a quinone, a photoreducible dye, or a carbonyl com-pound that has absorbance in the UV spectrum,
   iv) a polymer having a polymeric backbone and a cyclic olefinic pendent group,
   v) a copolymer of ethylene and a strained, cyclic alkylene,
   vi) ethylene/vinyl aralkyl copolymer,
   vii) a polymer having a polyethylenic backbone and pendant or terminal moieties comprising allylic moieties having at least one alpha hydrogen,
   viii) ethylene/methyl acrylate/benzyl acrylate terpolymer (EMBZ),
   ix) MXD6,
   x) a condensation polymer containing at least one carbon-carbon double bond, and
   xi) mixtures thereof.

18. The method of claim 17, wherein the polymer (iv) further comprises a linking group linking the cyclic olefinic pendent group to the polymeric backbone.

19. The method of claim 17, wherein the polymer (iv) is BVCH, BMCM, ECHA. or CHAA.

20. The method of claim 1, further comprising, before step c), making a package comprising the oxygen scavenger.

21. The method of claim 1, further comprising, after step c), making a package comprising the triggered oxygen scavenger.

22. The method of claim 1, wherein the actinic radiation in the first subjecting step is infrared light, microwave, visible light, ultraviolet light, X-ray, gamma ray, corona discharge, or electron beam irradiation and the actinic radiation in the second subjecting step is infrared light, microwave, visible light, ultraviolet light, X-ray, gonna ray, corona discharge, or electron beam irradiation.

23. The method of claim 1, further comprising, before step c), filling a package comprising the oxygen scavenger with a product.

24. The method of claim 1, further comprising, after step c), filling a package comprising the oxygen scavenger with a product.

25. The method of claim 1, wherein the first subjecting step comprises subjecting the oxygen scavenger to two or more initial doses of actinic radiation, wherein the total energy of the initial doses is insufficient to trigger the oxygen scavenger.

* * * * *